United States Patent [19]

Pearson et al.

[11] Patent Number: 5,744,412
[45] Date of Patent: Apr. 28, 1998

[54] COMPOSITION AND PROCESS FOR MAKING AN INSULATING REFRACTORY MATERIAL

[75] Inventors: Alan Pearson, Murrysville; Thomas G. Swansiger, Apollo, both of Pa.

[73] Assignee: Aluminum Company of America, Pittsburgh, Pa.

[21] Appl. No.: 644,440

[22] Filed: May 13, 1996

[51] Int. Cl.$^6$ .................................................. C04B 35/101
[52] U.S. Cl. .................................................. 501/127
[58] Field of Search .................................................. 501/127

[56] References Cited

U.S. PATENT DOCUMENTS

| | | | |
|---|---|---|---|
| 4,579,839 | 4/1986 | Pearson | 502/439 |
| 4,900,698 | 2/1990 | Lundsager | 501/80 |
| 4,970,181 | 11/1990 | Pearson | 501/127 |
| 5,252,526 | 10/1993 | Whittemore | 501/127 |
| 5,279,779 | 1/1994 | Fitch | 264/63 |
| 5,362,692 | 11/1994 | Bugajski et al. | 501/127 |

*Primary Examiner*—Karl Group
*Attorney, Agent, or Firm*—Glenn E. Klepac

[57] ABSTRACT

A composition and process for making an insulating refractory material. The composition includes calcined alumina powder, flash activated alumina powder, an organic polymeric binder and a liquid vehicle which is preferably water. Starch or modified starch may also be added. A preferred insulating refractory material made with the composition has a density of about 2.4–2.6 g/cm$^3$ with reduced thermal conductivity, compared with tabular alumina. Of importance, the formulation has good abrasion resistance and crush strength during intermediate processing (commercial sintering) to attain full strength and refractoriness, good abrasion resistance and crush strength.

17 Claims, No Drawings

COMPOSITION AND PROCESS FOR MAKING AN INSULATING REFRACTORY MATERIAL

ORIGIN OF THE INVENTION

The invention described herein was made in the performance of Contract No. DE-FC07-89ID 12903 awarded by the U.S. Department of Energy and may be manufactured and used for governmental purposes without payment of any royalties therefor.

FIELD OF THE INVENTION

The present invention relates to insulating refractory materials and more particularly to a composition and process for making a high alumina refractory material having low density and hence reduced thermal conductivity, while still exhibiting good resistance to corrosion by steel slags.

BACKGROUND OF THE INVENTION

The present invention relates to insulating refractory materials that are used to make bricks and other shapes for metallurgical vessels.

In the prior art, tabular alumina has been employed for many years as a refractory aggregate in metallurgical vessels. However, tabular alumina has a density of about 3.6 g/cm$^3$ and it conducts heat well, so that substantial heat losses are associated with such vessels.

Attempts have been made in the prior art to produce lightweight refractory aggregates. Some of the materials employed in these efforts include bubble alumina, perlite, diatomite and expanded clay. However, none of the prior art attempts has resulted in an entirely satisfactory product.

Among the preferred requirements for a lightweight refractory aggregate suitable for metallurgical vessels are the following properties: lower density than tabular alumina, preferably less than 2.7 g/cm$^3$ and more preferably about 2.4–2.6 g/cm$^3$; resistance to penetration by molten metals and steel slag; fired crush strength on the order of that exhibited by fused aluminas (i.e., significantly stronger than hollow spheres); cost not more than 25% higher than tabular alumina on a volume basis; and good "intermediate strength" during sintering as measured by abrasion resistance and crush strength after exposure to 500° C. for two hours.

It is a principal objective of the present invention to provide a composition suitable for making a refractory aggregate having a high alumina content and the properties listed above.

A related objective of the invention is to provide a process suitable for industrial manufacture of the insulating refractory material of the invention.

Additional objectives and advantages of our invention will become apparent to persons skilled in the art from the following detailed description.

SUMMARY OF THE INVENTION

In accordance with the present invention, there is provided a composition for making an insulating refractory material. The composition comprises calcined alumina powder, flash activated alumina powder, an organic polymeric binder and a liquid vehicle. Optionally, starch or modified starch is added to the composition.

The calcined alumina powder has an average particle size of greater than about 50 microns, preferably about 60–100 microns. The powder has an LOI (loss on ignition at 1100° C.) of less than 1 wt. % and total water content is less than 2 wt. %. Total content of $Al_2O_3$ is greater than about 98 wt. %, preferably greater than about 99 wt. %.

A particularly preferred calcined alumina is sold by Aluminum Company of America of Pittsburgh, Pa. as A-13 calcined alumina. This material has an ultimate crystal size of less than 1 micron; about 6–12 m$^2$/g average surface area; total water content about 0.5–1.0 wt. %; 0.4 wt. % LOI and specific gravity about 3.6–3.8. Particle size analysis reveals the following distribution: 0–6% retained on 100 mesh, 30–70% retained on 200 mesh, 80–90% retained on 325 mesh and 4–20% through 325 mesh. Typical impurity contents are 0.30 wt. % max. $Na_2O$, 0.04 wt. % max. $SiO_2$ and 0.04 wt. % max. $Fe_2O_3$.

The flash activated alumina powder of the invention is produced by rapidly activating hydrated alumina, i.e. $Al(OH)_3$ to create a porous, poorly crystallized, reactive alumina. The alumina is activated rapidly by exposure to an elevated temperature greater than about 300° C. for less than one minute, preferably about 400°–1000° C. for a fraction of a second to about 10 seconds. Preferred activation conditions are an inlet air temperature of 700°–870° C., outlet temperature of 350°–500° C. and a powder residence time of less than 3 seconds. The product typically has a residual water content (LOI) of about 4–12 wt. %, as measured by weight loss on heating to 1100° C. after drying at 250° C. Preferably, the powder has an LOI of about 6–10 wt. %.

The flash activated alumina has an average particle size of about 10 microns or less, preferably about 0.3–7 microns. A particularly preferred powder has an average particle size of about 5 microns, an LOI of about 6.5 wt. %, and contains about 93 wt. % $Al_2O_3$. Average surface area is about 250 m$^2$/g.

The organic polymeric binder may be a modified methyl cellulose, methyl cellulose, modified cellulose, cellulose, polyvinyl alcohol, polyacrylamide, polyamide, polyoxyethylene, dextrin, or mixture of such polymers. Modified methyl cellulose is particularly preferred. We successfully used Methocel 20-214 and F4M methyl cellulose from Dow Chemical Company. This binder is made by reacting cellulose with propylene oxide and methyl chloride. It decomposes at about 225° C.

The composition may contain starch or modified starch. We prefer a modified starch made from precooked yellow corn which has a low ash content. A particularly preferred modified starch sold under the trademark "Mogul 1607" has an ash content of about 0.5 wt. % which ash contains about 7 wt. % magnesium oxide. Magnesium oxide content in the ash is a concern because of the possibility of increased densification by combination with alumina during sintering. The modified starch decomposes at about 310° C.

The preferred liquid vehicle is water. Water is needed to impart fluidity to the mixture during mixing and extrusion, and to promote bonding by the flash activated alumina particles. Water is also a low-cost burnout material for porosity in the sintered product. If desired, the water can be mixed with a minor proportion of a polyglycol such as polyethylene glycol or polypropylene glycol.

A solids mixture is made by mixing about 45–65 parts by weight of the calcined alumina powder, 30–45 parts by weight flash activated alumina powder, 1–10 parts by weight polymeric binder, and optionally 1–12 parts by weight starch or modified starch. The solids mixture preferably comprises about 50–60 parts by weight calcined alumina powder, 30–40 parts by weight flash activated alumina powder, 1–5 parts by weight binder and 2–10 parts by weight starch or modified starch.

The solids mixture is mixed with water to form a moldable mixture. A preferred moldable mixture contains about 100 parts by weight of the solids mixture together with about 20–35 parts by weight water. A particularly preferred moldable mixture contains about 54.6 parts by weight calcined alumina, 36.4 parts by weight flash activated alumina, 2.0 parts by weight binder and 7.0 parts by weight modified starch all mixed with about 34.8 parts by weight water. The mixture contains about 25.8 wt. % water.

The moldable mixture is formed into discrete bodies which are aged in the presence of water at an elevated temperature and then calcined at a temperature above 1000° C. for a sufficient time to convert at least most of the activated alumina to alpha alumina. Preferably, the bodies are calcined at about 1500°–2000° C. so that at least 99 wt. % of the alumina is alpha alumina.

The mixture is formed by extrusion or other suitable process into shapes such as cylinders or spheres. Preferably, the shapes are small extruded cylinders.

The extruded bodies are preferably aged in the presence of steam at a temperature of about 95°–150° C. More preferably, the bodies are steam aged for about 1–12 hours at 110° C.

The aged bodies are dried and then calcined at a temperature of about 1500°–2000° C., preferably about 1750° C. Calcining at this temperature converts essentially all of the alumina to alpha alumina. The bodies are preferably calcined in a shaft furnace.

After calcining, the density of the bodies is less than about 2.7 g/cm$^3$, preferably about 2.4–2.6 g/cm$^3$. The bodies may be incorporated directly as cylinders or spheres into refractory compositions or they may be crushed into particles which are useful ingredients for high alumina refractory shapes.

DETAILED DESCRIPTION OF A PREFERRED EMBODIMENT

Specimens of a lightweight refractory aggregate were made for testing of various properties, including fired density, intermediate strength (abrasion resistance and crush strength) after exposure to 500° C. for two hours, and fired strength (crush strength after firing at 1850° C.). Ingredients of the specimens are shown in Table I. Amounts of the dry ingredients are expressed in parts by weight (pbw) with the alumina contents amounting to 100 pbw. However, the water content is expressed as weight percentage (wt. %) of the entire mixture, both dry ingredients and water.

TABLE I

Ingredients of Refractory Aggregate Specimens

| Specimen No. | Unground Calcined Alumina (pbw) | Ground Calcined Alumina (pbw) | Flash Activated Alumina (pbw) | Binder (pbw) | Modified Starch (pbw) | Water (wt. %) |
| --- | --- | --- | --- | --- | --- | --- |
| 1 | 60 | 0 | 40 | 2.0 | 7.0 | 25.8 |
| 2 | 60 | 40 | 0 | 2.0 | 3.0 | 30.4 |
| 3 | 60 | 40 | 0 | 2.0 | 7.0 | 25.8 |
| 4 | 60 | 0 | 40 | 1.5 | 7.5 | 29.6 |

The unground calcined alumina has an average particle size of about 60–100 microns. Particle size analysis reveals the following distribution: 0–6% retained on 100 mesh, 30–70% retained on 200 mesh, 80–90% retained on 325 mesh and 4–20% through 325 mesh. All mesh sizes are U.S. sieve series. The powder has an LOI of less than 1 wt. % and total water content is less than 2 wt. %. A particularly preferred unground calcined alumina is sold by Aluminum Company of America, Pittsburgh, Pa. as A-13 calcined alumina.

Specimens 2 and 3 contained ground calcined alumina, which was made by grinding the calcined alumina powder described above until 100% passed through a 325 mesh. Average particle size was less than 45 microns.

The flash activated alumina powder has an average particle size of about 5 microns, an LOI of about 6.5 wt. % and total $Al_2O_3$ content of about 93 wt. %. Average surface area is about 250 m$^2$/g.

The binder is a hydroxypropyl methyl cellulose made by reacting cellulose with propylene oxide and methyl chloride. It has a decomposition temperature of about 225° C. A particularly preferred, modified cellulose was supplied by Dow Chemical Company of Midland, Mich. as Methocel 20–214 or Methocel F4M.

The modified starch is a heavyweight cereal binder made from precooked corn. A particularly preferred modified starch sold under the trademark "Mogul 1607" has a decomposition temperature of about 310° C. The modified starch reduces the stickiness of extrudates imparted by the polymeric binder. The modified starch is also less expensive than the Methocel binder.

The dry ingredients (alumina, binder and modified starch) were mixed in an RVO2 Eirich mixer having a bowl capacity of 20.3 liters, with a working capacity for mixing of 10 liters and a working capacity for pelletizing of 7 liters. Each batch included a total of 4.54 kg (10 pounds) of the dry ingredients. The dry ingredients were dry blended by intense mixing action in the Eirich mixer. Water was then added to the solids mixture to form a pelletized, moldable mixture.

The moldable mixture was formed in a Macquiceram extruder having a 7.62 cm (3 inch) auger and a 2 H.P. motor. The single hole die had a diameter of 1.778 cm (0.70 inch). A wire chopper cut the extrudates into 1.9 cm (0.75 inch) lengths.

The extrudates were divided into two batches and subjected to different types of aging. The steam aged (Steam) batch was inserted into metal baskets placed inside a 5 gallon metal container having a rimmed lid which was loosely fitted to avoid pressure build-up. Preheated water having a depth of about 1–2 inches was placed in the bottom of the container. The specimens did not contact the water. The entire container was placed in an air oven heated to 110° C., thereby exposing the specimens to a wet steam atmosphere. The exposure period was 4 hours. After the steam aging period, the specimens were dried overnight in an air oven at 110° C.

The air oven (Air) batch specimens were immediately placed in an air oven at 110° C. for overnight drying.

Intermediate strength was tested after heating the specimens for 2 hours at 500° C. to burn out the organic materials. Intermediate strength is important because when the extrudates are fired in commercial sintering processes, there will be a period of movement through a shaft furnace when the binder has decomposed, leaving a porous, weak structure. During this period before sintering has begun, the shapes are susceptible to disintegration caused by abrasion against adjacent shapes and by compressive loading due to bed height.

An abrasion test was performed by placing approximately 80 grams of the shapes on a screen and shaking them for 1 to 3 minutes in a mechanical shaker. Alumina particles were abraded from the weakened shapes. The higher percentage weight losses represent poorer intermediate strength.

A stress test was performed on cylindrical shapes which were machined to exact sizes (on the order of 0.5 inch diameter) and then held at 500° C. for 2 hours to burn out the organic binders. The specimens were then fractured (diametral stress test) using a Chatillon tester to measure fracture stress.

Some specimens were also fired in a gas-fired converter having a 30 inch diameter shell and an 18 inch inside diameter. The sample chambers were formed from alumina bricks. Heat-up from ambient to 1830° C. required about 3.5 hours. The samples were retrieved after an overnight cool-down period. Temperature was monitored through a sight port utilizing an optical pyrometer focused on a specimen.

Crushing strength was measured on the fired specimens by crushing them and then selecting 20 nearly spherical samples each having a −8+10 mesh size. The maximum test load at fracture in a diametral compression test and the average screen size were used to calculate the fracture stress.

Results of the intermediate and fired strength tests are shown in Table II. The steam aged specimens made with flash activated alumina (specimens 1 and 4) were found to have the lowest abrasion losses and highest crush strengths. However, these specimens also had lower fired strengths than samples 2 and 3, which contained only calcined alumina.

TABLE II

Intermediate Strength and Fired Strength in Refractory Aggregates

| Aging Specimen No. | Intermediate Strength | | | | Fired Strength | |
|---|---|---|---|---|---|---|
| | Air Abrasion Loss (wt. %) | Steam Abrasion Loss (wt. %) | Crush Strength (MPa)$^{(1)}$ | Crush Strength (MPa)$^{(1)}$ | Air Strength (MPa)$^{(2)}$ | Steam Strength (MPa)$^{(2)}$ |
| 1 | 50.30 | 21.00 | 0.040 | 0.132 | 30.2 | 32.4 |
| 2 | 87.70 | 74.80 | 0.036 | 0.029 | 56.4 | 69.2 |
| 3 | 74.70 | 86.30 | 0.037 | 0.011 | 60.5 | 65.7 |
| 4 | 39.50 | 20.20 | 0.033 | 0.113 | 42.8 | 40.8 |

$^{(1)}$Size = 0.5 inch diameter
$^{(2)}$Size = −8 + 10 mesh grains (approximately equiaxial)

Fired specimens were also tested for density, using the method of ASTM C20-80a. Five specimens of each sample were tested and results were averaged. Results are shown in Table III. The lowest density, 2.495 g/cm³, was achieved on steam aged specimens made with activated alumina.

TABLE III

Refractory Aggregate Fired Density

| Specimen No. | Air Oven Aged Fired Density (g/cm³) | Steam Aged Fired Density (g/cm³) |
|---|---|---|
| 1 | 2.589 | 2.597 |
| 2 | 2.792 | 2.774 |
| 3 | 2.821 | 2.840 |
| 4 | 2.497 | 2.495 |

We also performed a set of comparative tests on specimens made with calcium aluminate cement instead of activated alumina. Steam aged specimens made with calcium aluminate were found to have substantially lower intermediate strength (measured by both abrasion loss and crush strength) than the specimens which contain activated alumina.

The foregoing detailed description of our invention has been made with reference to some particularly preferred embodiments. Persons skilled in the art will see that numerous changes and modifications can be made therein without departing from the spirit and scope of the following claims:

We claim:

1. A composition suitable for making an insulating refractory material, said composition comprising:
    a) about 45–65 parts by weight calcined alumina powder, having an average particle size greater than about 50 microns,
    b) about 30–45 parts by weight flash activated alumina powder having an average particle size of about 10 microns or less,
    c) about 1–10 parts by weight of an organic polymeric binder,
    d) about 1–12 parts by weight starch or modified starch, and
    e) a liquid vehicle.

2. The composition of claim 1 wherein said flash activated alumina powder has an average particle size of about 0.3–7 microns.

3. The composition of claim 1 wherein said flash activated alumina powder is rapidly activated by exposure to an elevated temperature of greater than about 300° C. for less than one minute.

4. The composition of claim 1 wherein said flash activated alumina powder is rapidly activated by exposure to an elevated temperature of about 400°–1000° C. for a fraction of a second to about 10 seconds.

5. The composition of claim 1 wherein the flash activated alumina powder has an LOI of about 4–12 wt. %.

6. The composition of claim 1 wherein the flash activated alumina powder has an LOI of about 6–10 wt. %.

7. The composition of claim 1 wherein said organic binder is selected from the group consisting of modified methyl cellulose, methyl cellulose, modified cellulose, cellulose, polyvinyl alcohol, polyacrylamide, polyamnide, polyoxyethylene and dextrin.

8. The composition of claim 1 wherein said liquid vehicle is selected from the group consisting of water and mixtures of water with polyglycols.

9. The composition of claim 1 wherein said composition comprises about 50–60 parts by weight calcined alumina powder, 30–40 parts by weight flash activated alumina powder, 1–5 parts by weight binder and 2–10 parts by weight starch or modified starch.

10. The composition of claim 9 wherein said liquid vehicle comprises about 20–35 parts by weight water.

11. A composition suitable for making a refractory material, comprising:
    a) about 45–65 parts by weight calcined alumina powder,
    b) about 30–45 parts by weight flash activated alumina powder,
    c) about 1–10 parts by weight of an organic polymeric binder,
    d) about 1–12 parts by weight starch or modified starch, and
    e) about 20–35 parts by weight water.

12. The composition of claim 1 comprising about 20–35 parts by weight of said liquid vehicle.

13. The composition of claim 11 wherein said flash activated alumina powder is rapidly activated by exposure to an elevated temperature of greater than about 300° C. for less than one minute and has an LOI of about 4–12 wt. %.

14. A process for making low density refractory bodies comprising blending the composition of claim 1 into a moldable mixture, forming portions of said mixture into discrete bodies, aging said bodies in the presence of water, and calcining said bodies at a temperature greater than 1000° C.

15. The process of claim 14 wherein said bodies are aged in the presence of steam.

16. The process of claim 14 wherein said bodies are aged at a temperature of about 95°–150° C.

17. The process of claim 14 wherein said bodies are calcined at a temperature of about 1500°–2000° C.

* * * * *